Figure 1:
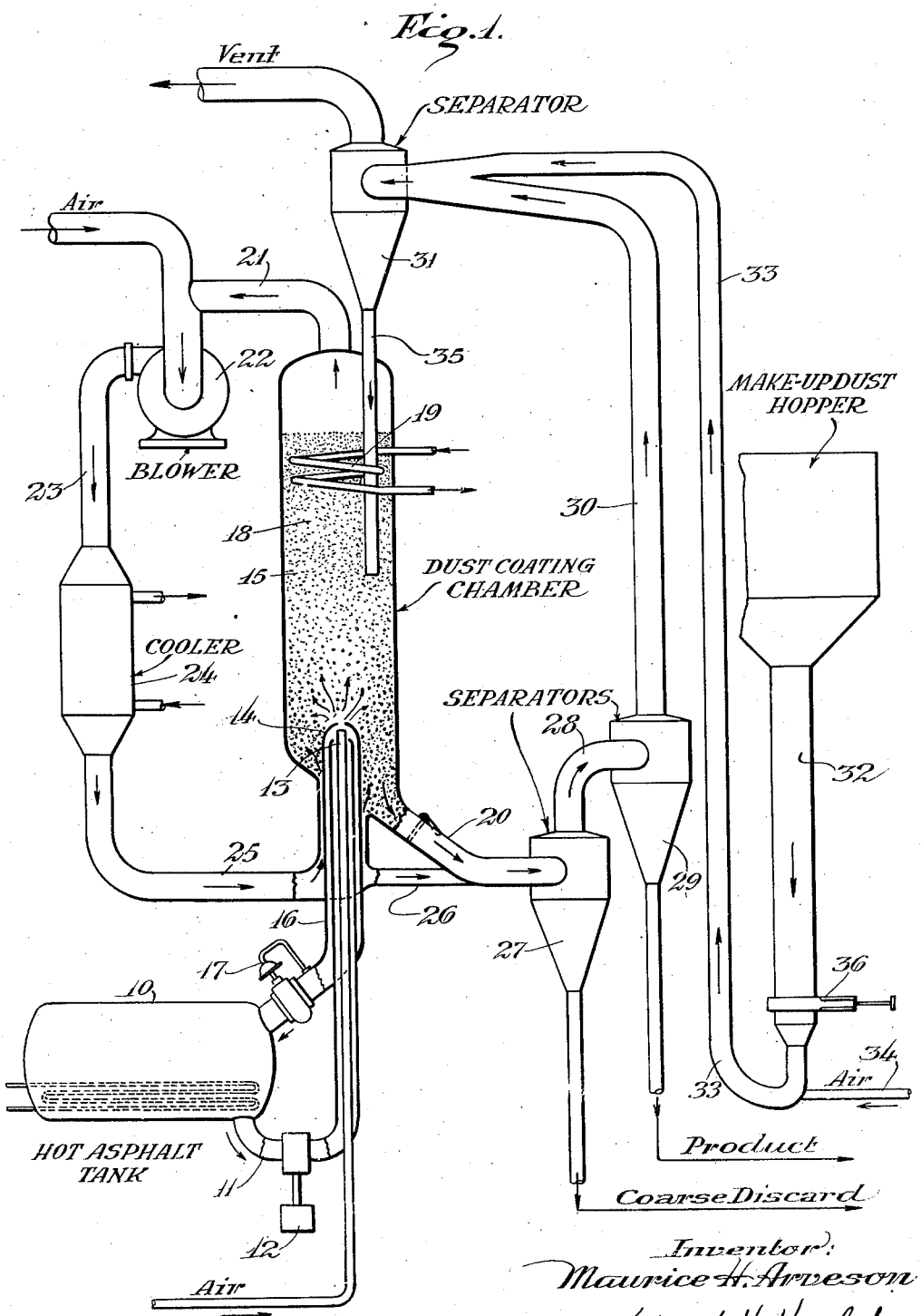

Patented May 7, 1946

2,399,717

UNITED STATES PATENT OFFICE 2,399,717

PRODUCTION OF DUST COATED MATERIALS

Maurice H. Arveson, Flossmoor, Ill., assignor to Standard Oil Company, Chicago, Ill., a corporation of Indiana Application November 1, 1941, Serial No. 417,455

11 Claims. (Cl. 117—100)

The present invention relates to a method and means for coating or otherwise covering particles of a plastic and sticky character with a dry, powdered dust-like material in order to prevent adhesion of the particles and coalescence thereof.

Particles which exhibit adhesive properties at normal temperatures such as synthetic resins, asphalt, natural resins and the like will adhere to one another and in certain instances, will flow together in time, forming a solid mass. These adhesive properties may be inherent or develop on storage as a result of deterioration, moisture absorption or the like.

The term "adhesive materials" used hereinafter refers to materials which may be described as viscous, semisolid, plastic, solid, resinous or the like such as synthetic resins, asphalt, natural resins and the like, all exhibiting the property, when in a subdivided state, of adhering, fusing or coalescing or the like on storage, thus destroying the free-flowing characteristic of the originally finely sub-divided material. It is often desirable to prepare small particles of normally adhesive material in a free-flowing form so that the pulverized or atomized plastic and sticky substances may be shipped or otherwise transported without adhering to itself or to containers or to anything with which it may come in contact.

It is sometimes desired to spray articles with a material containing asphalt and a filler through a flame gun so that asphalt coatings may be placed on structural materials, fabric, paper and the like without using solvents. Under these and similar circumstances the asphalt or other normally adhesive material can be handled much more easily if it is provided in the form of free-flowing, non-sticky particles. Such a product may be prepared by coating the particles of adhesive substances with a fine powdered dust-like material which adheres to the particles themselves but prevents the particles from sticking to each other.

It is an object of the present invention to provide an improved method for preparing finely divided, permanently free-flowing particles of a normally adhesive material.

A further object is to provide means for carrying out the improved method.

Still another object is to provide a product consisting of free-flowing particles of a normally adhesive material.

Figure 2:
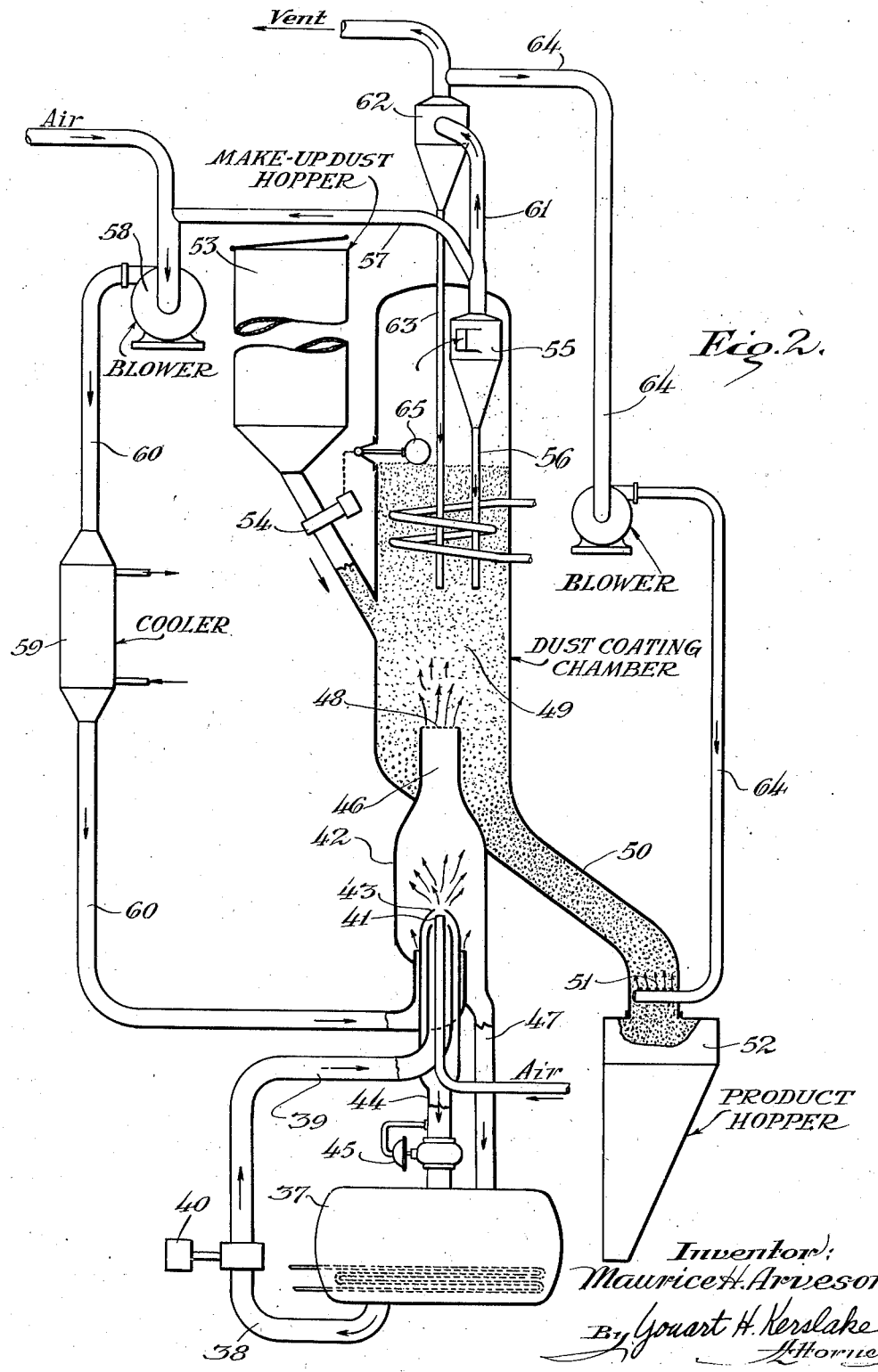

Broadly, the present invention involves spraying or atomizing the adhesive material while in a fluid or semi-fluid state and projecting the particles so formed into a zone containing dust suspended therein whereby the particles, while cooling to normal temperatures, pick up the dust on their outer surfaces forming a coating which prevents adhesion of the particles and thereby facilities handling of the material. Means for carrying out this procedure are shown, by way of illustration, in the accompanying drawings in which:

Figure 1 represents a diagrammatic flow sheet of a system for dust coating atomized particles of a normally adhesive material; and Figure 2 represents a modification of the system shown in Figure 1.

In the following more detailed description of the system reference will be made to asphalt but I do not intend to be limited thereto since other normally adhesive resinous materials may be coated equally well and with the same desired results. Also, reference will be made to dust and by this term I intend to include both organic and inorganic materials which are capable of being pulverized to a dust-like condition such as silica dust, clay dust, limestone dust, stamping mill effluents, Cottrell precipitates of inorganic dusts in general, flour and the like.

With particular reference to Figure 1, asphalt is maintained in a liquid condition in tank 10 by heating same. This liquid asphalt is pumped through line 11 by means of pump 12 to air injector 13. The mixture of inert gas, for example, air and hot asphalt is then sprayed by atomizer 14 into the chamber 15 where the coating of the sprayed particles with dust takes place. Although various types of atomizers or spraying devices may be used, the one shown diagrammatically in Figure 1 is provided with a return pipe 16 so that excess asphalt may be returned to the tank 10. A pressure control device 17 is provided in the return pipe 16 so that the pressure existing at the atomizer 14 may be accurately controlled.

Chamber 15 contains dust which is aerated or fluidized by a current of air or other inert gaseous medium to form a turbulent dense dust phase 18. Immediately adjacent the atomizer 14, however, the density of the dust will be less due to the spray of air and hot asphalt. This dense phase and the circulating system for the dust, described hereinafter may be visualized best by comparing the dense dust phase with a liquid medium and the dilute dust phase with vapor-laden air. The dust material may have a particle size of about 10 to 100 microns, although other particle sizes may be used provided only that the dust be of such particle size and density that it may be suspended, aerated and handled in the manner herein described.

As an example, the bulk density of the settled dust may be about 30 to 40 pounds per cubic foot. When this dust is subjected to slight aeration with air or other gaseous mediums having velocities of about .03 to .3 feet per second, its bulk density may be about 25 to 35 pounds per cubic foot. When the dust is suspended in a chamber by air having a vertical velocity of about .4 to 4 feet per second or more, specifically about 1½ to 2½ feet per second, the dust is maintained in a dense, turbulent, suspended dust phase having a bulk density of about 10 to 25 pounds per cubic foot. The above examples of velocities and densities apply to the case of a fine clay powder such as commercial Super Filtrol powder. However, the velocity used will depend on the dust employed, and I prefer an air velocity which will give a bulk density of about 5 to 30, for example about 15 to 18 pounds per cubic foot in the dense turbulent phase. In the dilute or dispersed dust phase the bulk density may be from 1 to 4 pounds per cubic foot, although it is usually below 1 pound per cubic foot.

It is to be understood that the foregoing is merely an example of a particular set of dust conditions and that other conditions may be utilized when desired.

As the atomized particles of asphalt are sprayed into the chamber 15 they are completely and effectively coated with the dust forming a free flowing mass of dust coated asphalt particles. In order to ensure that the asphalt particles are hardened before leaving the chamber the chamber is maintained at a temperature distinctly lower than the molten fluid in line 11, for example by cooler 19. Since the gas velocity through the chamber is insufficient to suspend the coated asphalt particles they tend to concentrate in the bottom of the chamber and are removed along with a quantity of excess dust through pipe 20. The disposition of the coated particles will be described hereinafter.

A small amount of the finer dust particles will be carried to the top of the chamber and will leave the chamber through the air outlet pipe 21. A blower 22 serves to circulate the air (and finer dust particles) from the chamber 15, through pipes 21 and 23, cooler 24 and inlet pipe 25. Leading off from inlet pipe 25 is a small pipe 26 communicating with valved pipe 20 and terminating at a separator 27. Pipe 26 is so arranged as to impel the coated asphalt particles from the chamber 15 to the separator 27, where an initial separation occurs, removing the undesirable coarser asphalt particles which form in a small though appreciable amount. Of course, whenever large coated asphalt particles are desired the atomization may be adjusted so that the main proportion of the product will have a large size. In the present case, however, the finer size is preferred since it is easier to handle and permits a more compact product to be transported. The finer coated asphalt particles and accompanying excess dust are delivered from separator 27 through pipe 28 to a second separator 29 where the main product is separated from the accompanying dust. This excess dust is passed through line 30 to a separator 31, where the dust is knocked down and returned to the system.

In order to make up for the dust removed from the system by the coating of the asphalt a makeup dust container 32 is provided, the dust being passed through line 33 to the separator 31 by means of an air current entering at 34. A standpipe 35 extends from the separator 31 into the chamber 15 to a point below the top surface of the dense dust phase. The proper amount of makeup dust necessary for maintaining the proper level in the chamber 15 is controlled by a valve 36 at the bottom of the container 32.

A modified arrangement is shown in Figure 2 wherein the coarser particles of asphalt or other adhesive material are separated from the proper sized particles before contact with the dense dust phase. In Figure 2, 37 represents a tank containing hot asphalt, which is impelled through pipes 38 and 39 by pump 40. Air is injected at 41. The hot asphalt is sprayed into chamber 42 by atomizer 43. A return pipe 44 is provided for excess asphalt in the same manner as return pipe 16 in Figure 1. A pressure control device 45 operates to control the pressure at the atomizer 43. As described hereinafter, a vertical current of air or other inert gaseous medium is maintained in chamber 42. The atomizer is arranged in chamber 42 and the velocity of the current of air is adjusted so that the particles of asphalt having the desired size will pass upwardly through chamber 42 into the throat 46 while the larger sized particles will fall to the bottom of chamber 42 and then by return pipe 47 to tank 37. The throat 46 may be provided with a screening device 48 if desired, although the cross-sectional area of the throat 46 may be such as to provide the desired air velocity to carry the finer asphalt particles to the dust chamber 49 containing dust in a dense dust phase, as described above. Upon entering the dust chamber 49 the asphalt particles are coated and concentrate toward the bottom thereof. Dust chamber 49 has a greater cross-sectional area than chamber 42 so that the air velocity in chamber 42 is fast enough to carry the asphalt particles through the throat 46 to dust chamber 49, but in the latter chamber the air velocity is not fast enough to carry the particles further. The throat serves as an injector for the asphalt particles and after becoming coated with the dust they concentrate in pipe 50 which serves as a dust stripper, as will be described below. A cooler may be provided in chamber 49 if desired to ensure a substantial hardening of the particles. Obviously some of the dust tends to follow along with the coated asphalt particles through pipe 50. To prevent dust loss as far as possible an air spray 51 is located in pipe 50 to blow free excess dust back into the dust chamber 49. The size of pipe 50 and air velocity therein is such that the dust will be carried back into the chamber 49 where the dense dust phase will be maintained. The method of separating coated particles shown in Figure 1 is preferred and may be substituted for the method shown in Figure 2. In other words, centrifugal separation is in general more effective in removal of dust from the coated particles. The method of Figure 1, in effect, uses both stripping in the base of chamber 15 and classification in separators 27 and 29. Briefly, the air velocities in dust chamber 49 are less than the air velocity in either pipe 50 or chamber 42, in spite of the fact that the quantity of air in chamber 49 is the sum of that issuing from the top of pipe 50 and that issuing from the top of chamber 42.

The coated asphalt particles leave pipe 50 and fall into a hopper 52 from which containers are filled. A dust container 53 supplies makeup dust directly into dust chamber 49 through a control valve 54 which can be automatically controlled as described hereinafter.

A centrifugal separator 55 is located at the top of the dust chamber 49. The air passing upwards through chamber 49 and carrying a certain amount of dust with it, enters the separator 55 wherein a substantial portion of the dust is knocked down and returned to the dense dust phase through outlet 56. The substantially clean air may then pass through pipe 57, blower 58, cooler 59 and pipe 60 to the chamber 42 or it may pass through pipe 61, another centrifugal or Cottrell separator 62 where remaining dust, if any, is knocked down and returned to the dense dust phase through line 63, and the air vented to the atmosphere. If desired the cleaned air may be passed through line 64 to air sprayer 51 for stripping the dust accompanying the coated asphalt particles in pipe 50. This latter arrangement is particularly desirable when the atmospheric air contains impurities rendering it unfit for use in the system unless it is first purified or otherwise treated. A device 65 which is responsive to the height of the dense dust phase may be used for controlling valve 54 either electrically, mechanically or pneumatically, so that the level of the dense phase will be constant.

One of the many advantages of my process wherein the particles are injected into a dense phase of dust is that the common difficulty encountered in preparing particles is avoided; this common difficulty being the rapid clogging of equipment due to adhesion of the particles to the wall of the vessel in which the spraying is done. In the case of Figure 1, this difficulty is completely eliminated by directly injecting the atomized particles into a dense dust phase zone which completely surrounds the spray of particles ejected from the atomizer 14 before the particles reach the walls of the chamber, while in Figure 2 the small, though appreciable amount of dust passing through pipe 60 and chamber 42 minimizes the tendency of the walls of the chamber 42 and throat 46 to become coated with the particles and, thereby, becoming clogged. While asphalt has been specifically referred to above, it will be understood that other substances may be coated equally well. Clearly the heating of the material may be dispensed with if the material is normally liquid and is sprayable. In such case, however, it is generally necessary to refrigerate the particles during the coating step in order to prevent coalescence.

Although the atomizers or sprayers shown in the drawings are directed upwardly, it is to be understood that the atomizers may be disposed in any other position, either downwardly, obliquely, or horizontally provided the necessary procedural steps can be followed. Obviously various structural changes would be required if the direction of the atomizers were altered but, as stated hereinbefore, I do not wish to be limited by the constructions shown in the drawings.

It will be clear to one skilled in the art that the particular conditions of the process depend upon the particular material being coated, the type of dust used for coating and the desired size of dust-coated particles.

Various modifications of the present invention may be found by one skilled in the art without departing from the spirit of the invention. The scope of the present invention is to be limited only by the appended claims.

I claim:

1. Apparatus for coating particles of a normally adhesive solid or semi-solid material with dust to prevent coalescence thereof comprising a dust-coating chamber, means for introducing dust into said chamber, means for passing a gaseous medium upwardly through said chamber to suspend the dust in a dense phase having a bulk density of from about five pounds to about thirty pounds per cubic foot, means for spraying the normally adhesive material into said chamber in the form of particles, whereby the sprayed particles are coated with dust, and means for removing the coated particles from said chamber.

2. Apparatus for coating particles of a normally adhesive solid or semi-solid material with dust to prevent coalescence thereof comprising a dust-coating chamber, means for introducing dust into said chamber, means for passing a gaseous medium upwardly through said chamber to suspend the dust in a dense phase having a bulk density of from about five pounds to about thirty pounds per cubic foot, means for spraying the normally adhesive material into said chamber in the form of particles, whereby the sprayed particles are coated with dust, means for removing the coated particles from said chamber, and means for separating the coated particles from excess dust.

3. Apparatus for coating particles of a normally adhesive solid or semi-solid material with dust to prevent coalescence thereof comprising a dust-coating chamber, means for introducing dust into said chamber, means for passing a gaseous medium upwardly through said chamber to suspend the dust in a dense phase having a bulk density of from about five pounds to about thirty pounds per cubic foot, means for spraying the normally adhesive material into said chamber in the form of particles, whereby the sprayed particles are coated with dust, means for removing the coated particles from said chamber, means for separating the coated particles from excess dust, and means for returning the excess dust to said chamber.

4. Apparatus for coating particles of a normally adhesive solid or semi-solid material with dust to prevent coalescence thereof comprising a dust-coating chamber, means for introducing dust into said chamber, means for passing a gaseous medium upwardly through said chamber to suspend the dust in a dense phase having a bulk density of from about five pounds to about thirty pounds per cubic foot, means for spraying the normally adhesive material into said chamber in the form of particles, whereby the sprayed particles are coated with dust, means for removing the coated particles from said chamber and means for separating the finer dust-coated particles from the coarser dust-coated particles.

5. Apparatus for coating particles of a normally adhesive solid or semi-solid material with dust to prevent coalescence thereof comprising a dust-coating chamber, means for introducing dust into said chamber, means for passing a gaseous medium upwardly through said chamber to suspend the dust in a dense phase having a bulk density of from about five pounds to about thirty pounds per cubic foot, means for spraying the normally adhesive material, means for separating the coarser sprayed particles from the finer sprayed particles, means for introducing the finer sprayed particles into said chamber whereby said particles are coated with dust, and means for removing the coated particles from said chamber.

6. A process for coating particles of normally-adhesive material with a finely-divided solid dust which comprises the steps of maintaining within a coating zone a quantity of finely-divided solids, passing a gas upwardly through said zone, whereby said finely-divided solids are suspended in a dense turbulent solids phase having a density of between about 5 and about 30 pounds per cubic foot, spraying said normally-adhesive material, in liquid form, upwardly and directly into said dense phase to form particles thereof, whereby the sprayed particles of normally-adhesive material are coated with at least a portion of said solids, and continuously recovering the coated particles.

7. A process for coating particles of normally-adhesive material with a finely-divided solid dust which comprises the steps of maintaining within a coating zone a quantity of finely-divided solids, passing a gas upwardly through said zone whereby said finely-divided solids are suspended in a dense turbulent solids phase having a density of between about 5 and about 30 pounds per cubic foot, heating said normally-adhesive material to form a liquid material, spraying said heated normally-adhesive material upwardly and directly into said dense phase to form particles thereof, whereby the sprayed particles of normally-adhesive material are coated with at least a portion of said solids, and continuously recovering the coated particles.

8. A process as claimed in claim 7 and further comprising the steps of separating the coarser dust-coated particles from the bulk of the excess dust and from the finer dust-coated particles, separating the bulk of the excess dust from the finer particles, and returning the excess dust to said coating zone.

9. A process for coating particles of normally-adhesive material with a finely-divided solid dust which comprises the steps of maintaining within a coating zone a quantity of finely-divided solids, passing a gas upwardly through said zone, whereby said finely-divided solids are suspended in a dense turbulent solids phase having a density of between about 5 and about 30 pounds per cubic foot, heating said normally-adhesive material to form a liquid material, spraying said heated normally-adhesive material upwardly and directly into said zone to form particles thereof, whereby the sprayed particles of normally-adhesive material are coated with at least a portion of said solids, continuously recovering the coated particles, separating the coated particles from the bulk of the excess dust, and returning the excess dust to the coating zone.

10. A process for forming and coating particles of normally-adhesive material with a finely-divided solid dust which comprises the steps of maintaining within a contacting zone a quantity of finely divided solids, passing a relatively cool gas upwardly through said finely divided solids, whereby the solids are maintained in a dense turbulent suspended solids phase having a density of between about 5 and about 30 pounds per cubic foot, heating said normally-adhesive material to form a liquid material, spraying said heated normally-adhesive material upwardly and directly into said dense phase to form particles thereof, whereby said particles are cooled and coated by contacting with the finely-divided solid dust and removing coated particles downwardly from said dense turbulent suspended solids phase.

11. A process for forming and coating particles of normally-adhesive material with a finely-divided solid dust which comprises the steps of maintaining within a contacting zone a quantity of finely-divided solids, supplying relatively cool gas to said zone at a low point therein, passing the gases upwardly through said finely-divided solids, whereby the solids are maintained in a dense turbulent suspended solids phase having a density of between about 5 and about 30 pounds per cubic foot, heating said normally-adhesive material to form a liquid material, spraying said heated normally-adhesive material upwardly and directly into said zone at a low point therein to form particles thereof, whereby said particles are cooled and coated by contacting with the finely-divided solid dust within said zone, continuously separating the gases from the total solids within the said zone, removing downwardly from said dense turbulent suspended solids phase the coated particles, and continuously supplying finely-divided solid dust to said zone.

MAURICE H. ARVESON.